(12) United States Patent
Wilkie

(10) Patent No.: US 8,951,029 B2
(45) Date of Patent: Feb. 10, 2015

(54) MOBILE PLASTICS EXTRUSION PLANT

(75) Inventor: David John Wilkie, Jandakot (AU)

(73) Assignee: Polyline Piping Systems Pty Ltd., Jandakot (AU)

( * ) Notice: Subject to any disclaimer, the term of this patent is extended or adjusted under 35 U.S.C. 154(b) by 0 days.

(21) Appl. No.: 14/001,578

(22) PCT Filed: Feb. 24, 2012

(86) PCT No.: PCT/AU2012/000186
§ 371 (c)(1),
(2), (4) Date: Aug. 26, 2013

(87) PCT Pub. No.: WO2012/113035
PCT Pub. Date: Aug. 30, 2012

(65) Prior Publication Data
US 2013/0330434 A1    Dec. 12, 2013

(30) Foreign Application Priority Data
Feb. 25, 2011 (AU) .............................. 2011900665

(51) Int. Cl.
*B29C 47/08* (2006.01)
*B29C 47/00* (2006.01)
*B29C 47/88* (2006.01)

(52) U.S. Cl.
CPC .............. *B29C 47/00* (2013.01); *B29C 47/0838* (2013.01); *B29C 47/0864* (2013.01); *B29C 47/882* (2013.01); *B29C 47/0023* (2013.01)
USPC .............. 425/62; 425/71; 425/326.1; 425/380

(58) Field of Classification Search
USPC ............................ 425/62, 71, 326.1, 377, 380
See application file for complete search history.

(56) References Cited

U.S. PATENT DOCUMENTS

| | | | |
|---|---|---|---|
| 3,876,351 A * | 4/1975 | Takada ............................ | 425/62 |
| 4,072,453 A | 2/1978 | Oltmanns et al. | |
| 2001/0018078 A1* | 8/2001 | Kossl ............................. | 425/71 |
| 2011/0259773 A1 | 10/2011 | Chen | |

FOREIGN PATENT DOCUMENTS

| | | |
|---|---|---|
| EP | 1 704 984 | 9/2006 |
| GB | 802261 | 10/1958 |

OTHER PUBLICATIONS

Foster, "The Design and Benefits of Containerised Modular Plant Design", in Recent Advances in Mineral Processing Plant Design, by D. Malhotra, et al. (Ed), pp. 544-554, SME 2009.

* cited by examiner

*Primary Examiner* — Yogendra Gupta
*Assistant Examiner* — Joseph Leyson
(74) *Attorney, Agent, or Firm* — Hamre, Schumann, Mueller & Larson, P.C.

(57) ABSTRACT

A mobile plastics extrusion plant 10 for manufacturing an extruded plastics product in a remote location. The mobile plant 10 comprises the following components: a transportable container 16 for storing raw plastics material prior to extrusion, and a transportable extruded product forming assembly (in the form of a die and former assembly 12) for forming an extruded plastics product from the raw plastics material. The mobile extrusion plant 10 further comprises a transportable delivery system 18 for delivering the raw plastics material from the transportable container 16 to the die and former assembly 12 whereby, in use, the entire plant can be transported to a remote location and operated to manufacture an extruded plastics product.

9 Claims, 9 Drawing Sheets

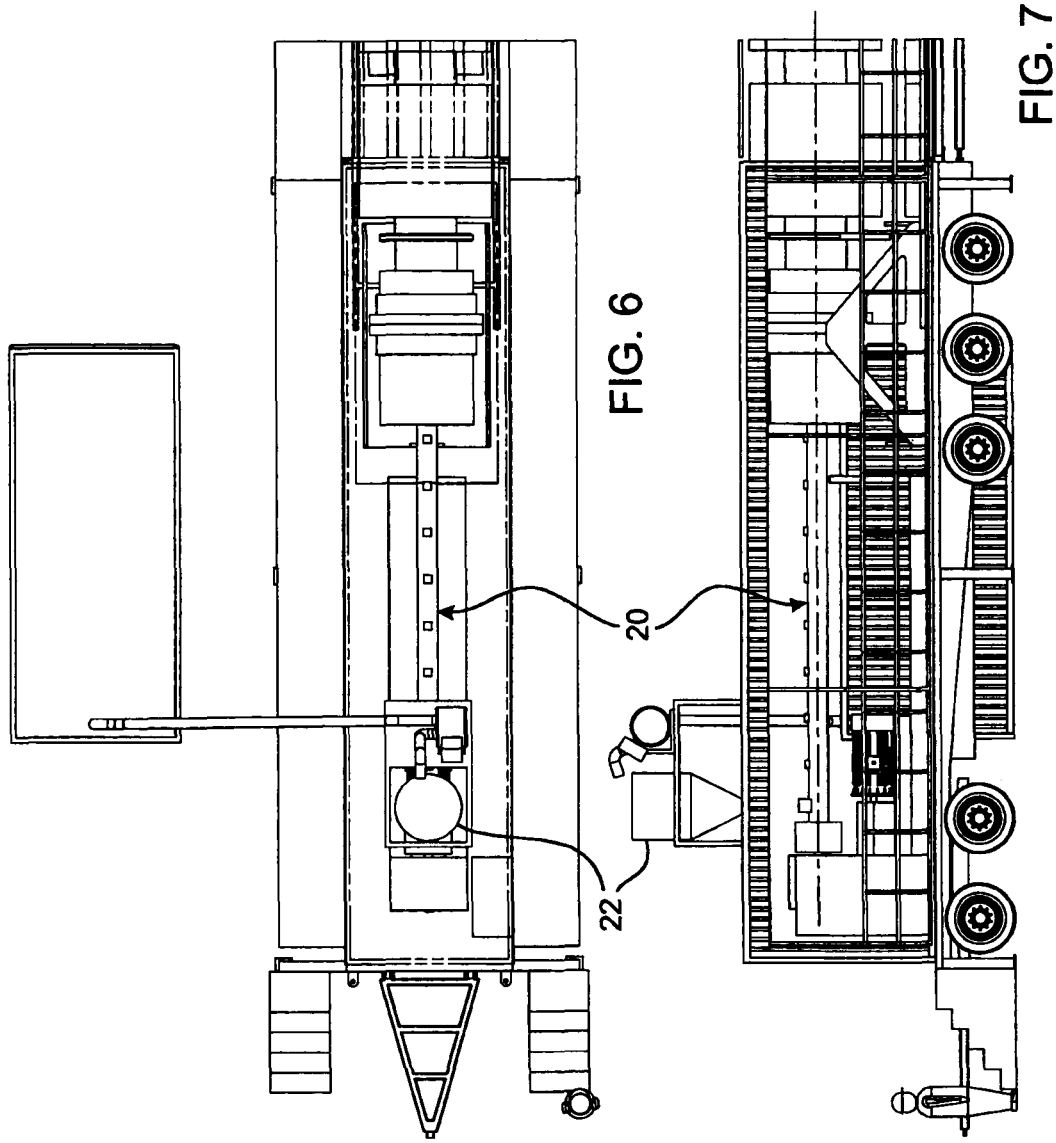

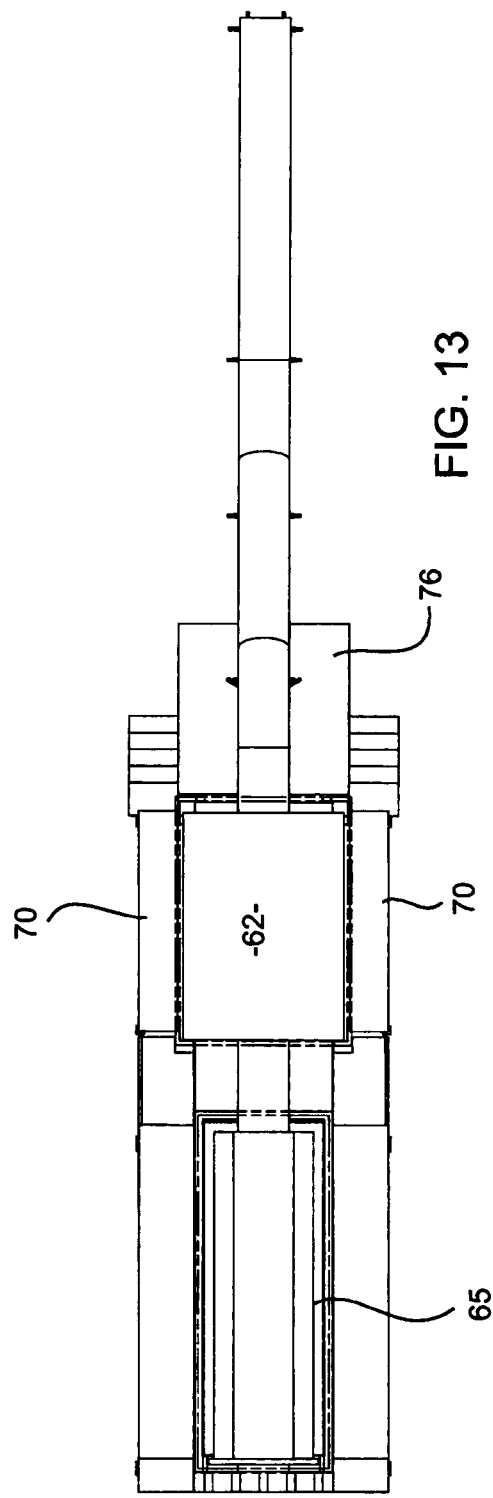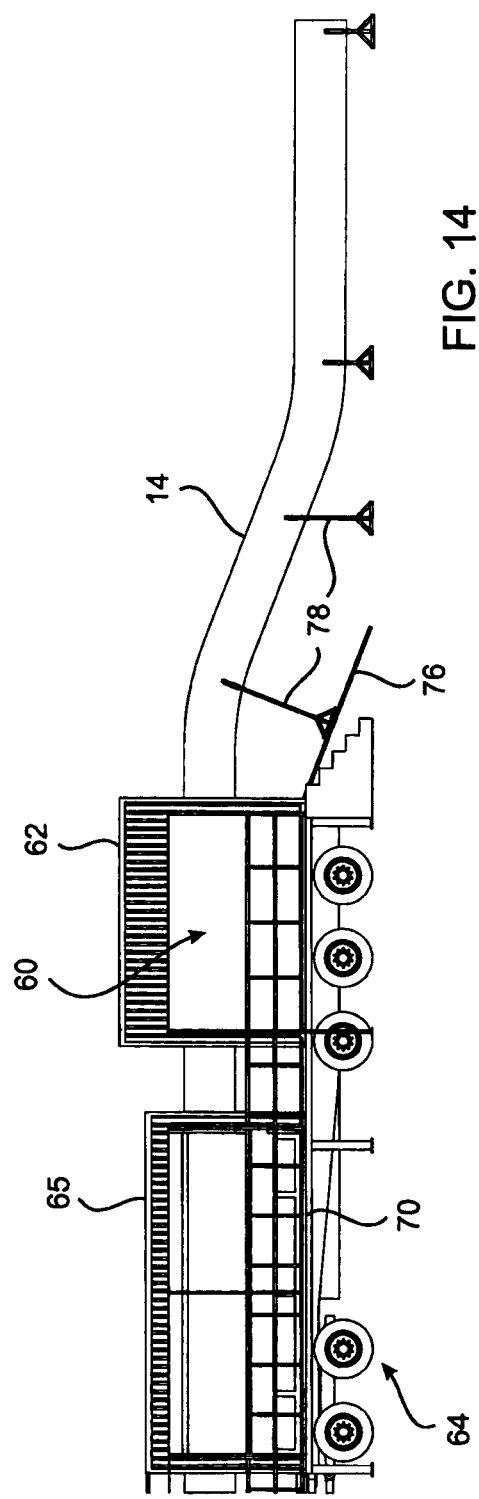

MOBILE PLASTICS EXTRUSION PLANT

FIELD OF THE INVENTION

The present invention relates to a mobile plastics extrusion plant and relates particularly, though not exclusively, to a mobile extrusion plant for extruding a pipe made of plastics material.

BACKGROUND TO THE INVENTION

With the demand for fossil fuels continuing to grow, new fields for oil and gas are continually being opened, some in quite remote locations. This necessitates the construction of lengthy pipelines to transport the oil or gas from the field to the refinery and/or nearest port and/or the end users. Likewise with climate change contributing to a growing scarcity of water from reservoirs near urban centres, alternative sources of water in more remote regions are being investigated. This may also necessitate the construction of lengthy pipelines to transport the water from the remote source to urban centres. Traditionally steel pipelines have been constructed for this purpose. However more recently pipelines constructed from plastics materials are being considered as a viable alternative. Plastics materials have the advantage of being corrosion-resistant and more lightweight than steel.

A disadvantage of using current pipeline construction techniques for both steel and plastics pipelines is the considerable expense of transporting the individual lengths of pipe to the route along which the pipeline is to be laid. In addition to transport costs there is also the cost of welding or otherwise connecting the individual lengths of pipe end to end.

The present invention was developed with a view to providing a mobile plastics extrusion plant which would enable a pipe made of plastics material to be manufactured in situ on the route along which the pipeline is to be laid. It will be apparent that the mobile plastics extruder could also be employed to manufacture other extruded plastics products and is not limited in its application to pipes.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a mobile plastics extrusion plant for manufacturing an extruded plastics product in a remote location, the mobile plant comprising the following transportable components:

a transportable container for storing raw plastics material prior to extrusion;

a transportable extruded product forming assembly for forming an extruded plastics product from the raw plastics material; and, a transportable delivery system for delivering the raw plastics material from the transportable container to the die and former assembly whereby, in use, the entire plant can be transported to a remote location and operated to manufacture an extruded plastics product.

Preferably each transportable component of the mobile plant is housed in a conventional shipping container. Advantageously the transportable components are mounted on a plurality of semitrailers for transporting the mobile plant by road.

Typically the extruded product forming assembly comprises a die and former assembly. Preferably the extruded product forming assembly further comprises a screw conveyor for conveying the raw plastics material under pressure to the die and former assembly.

Preferably the mobile plant comprises the following additional components:

a transportable vacuum tank for cooling the extruded plastics product; and, a transportable haul-off assembly for controlling the rate at which the extruded plastics product comes out of the plant.

Preferably the mobile plant comprises the following additional component:

a transportable electric generator for generating electrical power to operate each of the powered components of the mobile plant.

Advantageously each semitrailer is provided with means for locking the semitrailer to an adjacent semitrailer whereby, in use, when the mobile plant is in a stationary position the plurality of semitrailers can be locked together to form a rigid platform for the components of the mobile plant. Typically the locking means comprises a plurality of retractable connecting beams provided on the chassis of each semitrailer, each connecting beam being extendable so as to engage with the chassis of an adjacent trailer.

Advantageously each semitrailer is provided with a retractable walkway whereby, is use, when the mobile plant is in a stationary position plant operators can walk from one end of the mobile plant to the other. Preferably the retractable walkway folds down from a longitudinal side of the semitrailers. Preferably there are two retractable walkways, one on each longitudinal side of the semitrailers.

Preferably each semitrailer is provided with retractable stabilisers whereby, in use, when the mobile plant is in a stationary position the stabilisers can be extended to further stabilise the chassis of the semitrailers.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of mobile plastics extrusion plant, given by way of example only, with reference to the accompanying drawings, in which:

FIG. 6 is a partially cut-away, top plan view of the second semitrailer illustrated in FIG. 5;

FIG. 7 is a partially cut-away, side elevation of the second semitrailer illustrated in FIG. 5;

FIG. 13 is a partially cut-away, top plan view of the fourth semitrailer illustrated in FIG. 12; and, FIG. 14 is a partially cut-away, side elevation of the fourth semitrailer illustrated in FIG. 12.

DETAILED DESCRIPTION OF PREFERRED EMBODIMENTS

Figure 1:
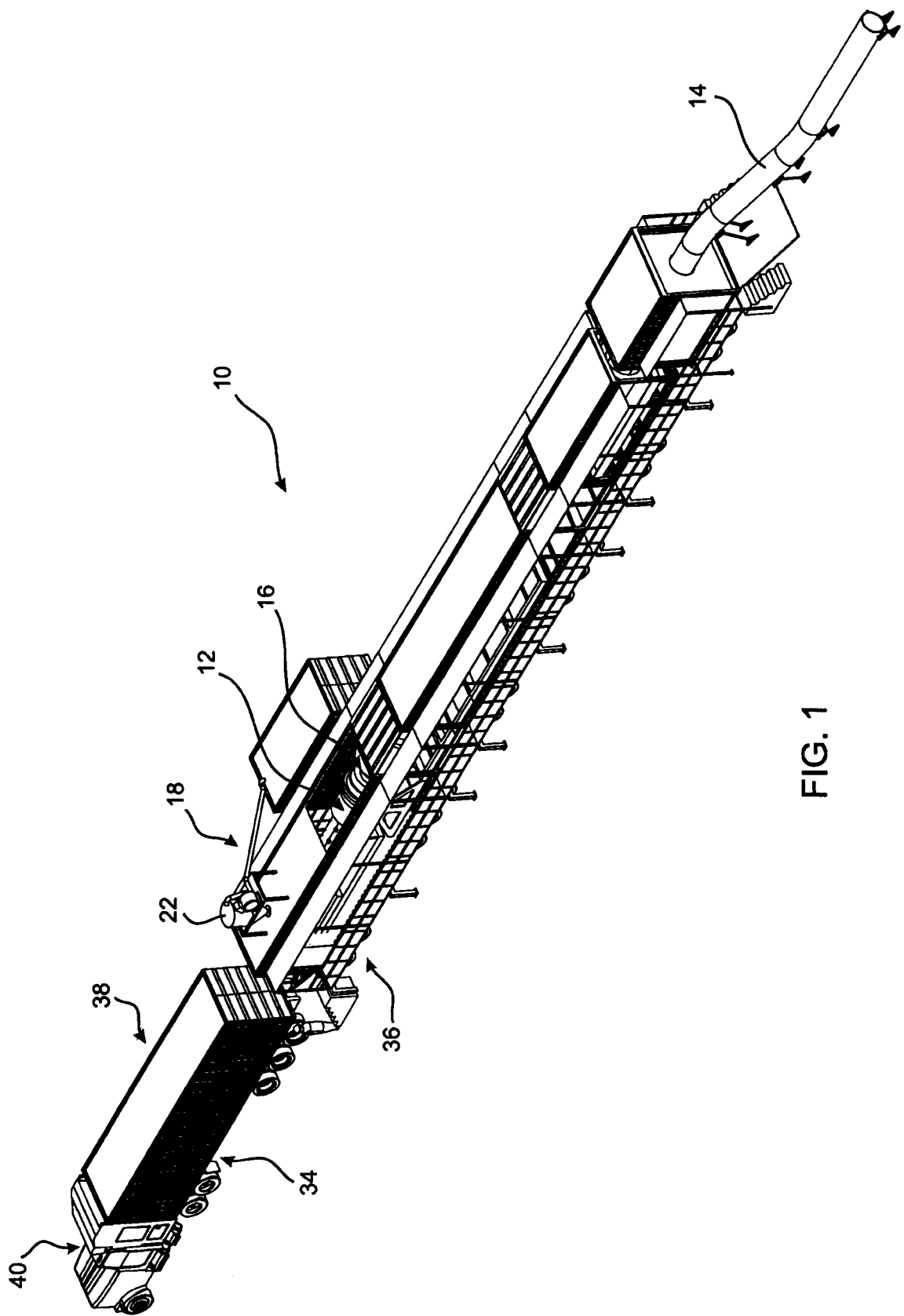
FIG. 1 is a top perspective view of a preferred embodiment of a mobile plastics extrusion plant in accordance with the present invention.
Figure 2:
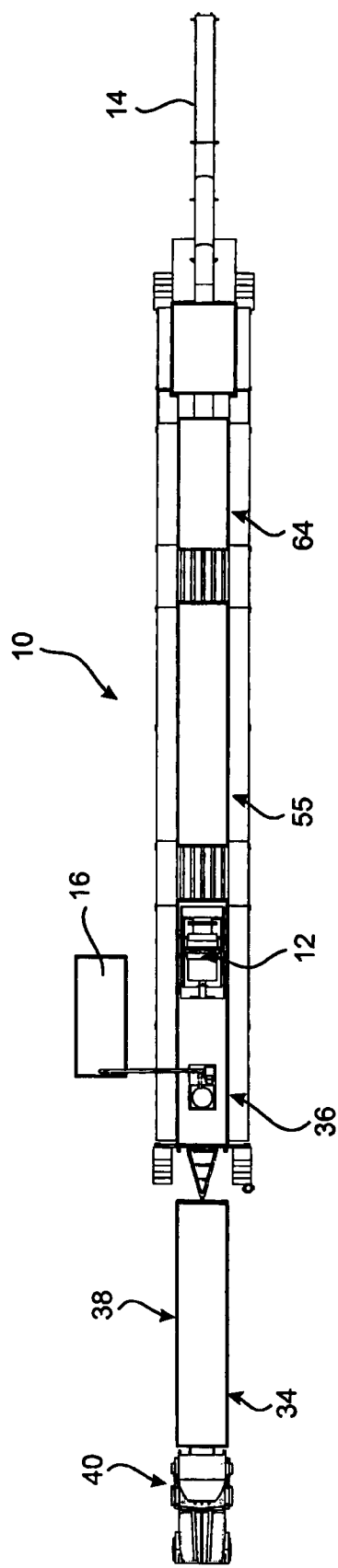
FIG. 2 is top plan view of the mobile plant of FIG. 1.
Figure 3:
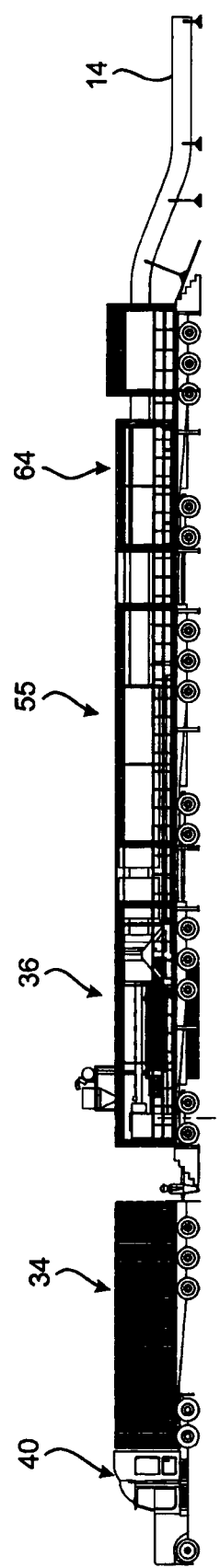
FIG. 3 is a side elevation of the mobile plant of FIG. 1.
Figure 4:
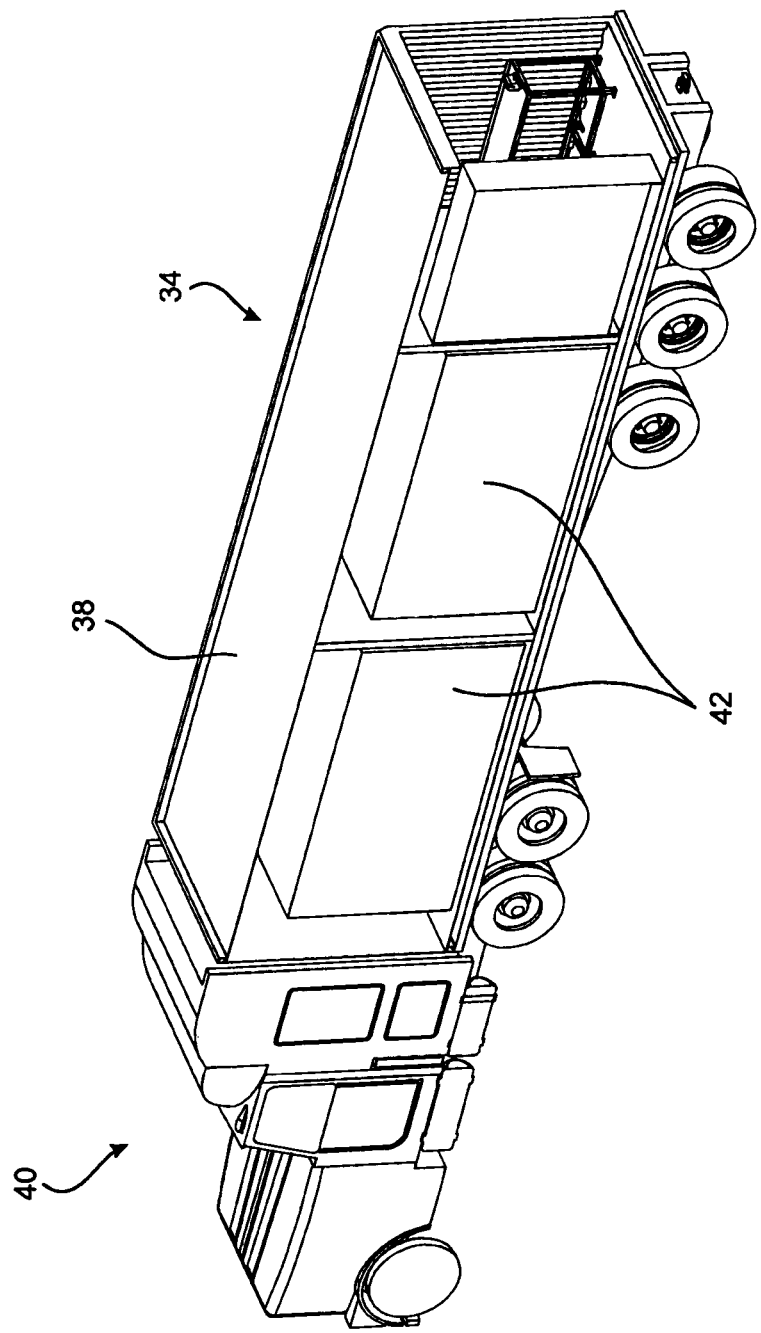
FIG. 4 is a partially cut-away, top perspective view of a first semitrailer and a prime mover of the mobile plant in FIG. 1.

A preferred embodiment of mobile plastics extrusion plant 10 in accordance with the invention, as illustrated in FIGS. 1 to 14, comprises a transportable container 16 for storing raw plastics material prior to extrusion. The raw plastics material is typically a thermoplastic material such as polyethylene or polypropylene in the form of small beads, sometimes referred to as resin. The raw thermoplastic beads are preferably transported in a shipping container 16, which in this case is transported separately from the other transportable components of the mobile plant 10.

The mobile extrusion plant 10 further comprises a transportable extruded product forming assembly, which typically comprises a die and former assembly 12 for forming an extruded plastics product. The die and former assembly 12 is what gives the final product its profile, and is designed so that the molten thermoplastic material flows evenly to the product's profile shape, in this case a hollow cylindrical profile of a pipe or tube 14. In the illustrated embodiment a continuous pipe 14 with an outside diameter of 924 mm is produced. It will be understood that almost any product can be manufactured by the mobile plant 10, so long as it has a continuous profile.

The extruded product forming assembly further comprises a screw conveyor 20 for conveying the raw plastics material under pressure to the die and former assembly 12, as can be seen most clearly in FIGS. 6 and 7. The screw conveyor 20 comprises a rotating screw (not visible) for forcing the plastic beads forward into a heated barrel, which heats the beads to a desired melt temperature (typically ranging from 200° C. (392° F.) to 275° C. (527° F.) depending on the polymer. Electrical heaters (not visible) are provided in connection with barrel of the screw conveyor 20 and the die and former assembly 12 for melting the thermoplastic beads. Some heating may also occur due to the intense pressure and friction taking place inside the barrel of the screw conveyor 20. As can be seen most clearly in FIGS. 5, 6 and 7 an electric motor 24 and gearbox 26 are also provided for driving the screw conveyor 20.

The mobile plant 10 also comprises a transportable delivery system 18 for delivering the raw plastics material from the transportable container 16 to the die and former assembly 12. The transportable delivery system 18 preferably comprises a top mounted hopper 22 which gravity feeds the thermoplastic beads into the rear of the barrel of the screw conveyor 20. A vacuum pump 28 draws the plastic beads in an air stream through a suction hose 30 from the container 16.

In use, the entire plant 10 can be transported to a remote location and operated to manufacture the extruded plastics product. Preferably each transportable component of the mobile plant 10 is housed in a conventional or modified shipping container. In the illustrated embodiment the die and former assembly 12, screw conveyor 20 and its associated electric motor 24 and gearbox 26, the hopper 22 and its associated vacuum pump 28 and suction hose 30 are all mounted in a second large (40 foot, high roof, modified) shipping container 32.

Advantageously the transportable components are mounted on a plurality of semitrailers for transporting the mobile plant 10 by road. In the illustrated embodiment the second container 32 is mounted on a second semitrailer 36, which is one of a plurality of semitrailers coupled together to form a road train and all drawn by a prime mover 40 (see FIG. 1). A first semitrailer 34, coupled directly to the prime mover 40, carries a first large shipping container 38 which houses a transportable electric generator 42. The electric generator 42 generates electrical power to operate each of the powered components of the mobile plant 10, such as the electric motor 24 and the vacuum pump 28. Preferably the electric generator is one of a pair of diesel powered electric generators 42 housed in the shipping container 34. Advantageously, the first shipping container 34 also houses a workshop, including a workbench 44, storage shelving 46 and other workshop facilities for maintaining and servicing the mobile plant 10 whilst on the road.

Once the thermoplastics material has been formed into a product it must be cooled, and this is typically achieved by moving the extruded product through a water bath. Plastics materials are extremely good thermal insulators and are therefore difficult to cool quickly. In a tube or pipe extrusion line, a sealed water bath is acted upon by a carefully controlled vacuum to keep the newly formed and still molten tube or pipe 14 from collapsing. Preferably the mobile plant further comprises a transportable vacuum tank for cooling the extruded plastics product. In the illustrated embodiment the vacuum tank is in two stages, a high vacuum tank 50 followed by a low vacuum tank 52.

Figure 5:
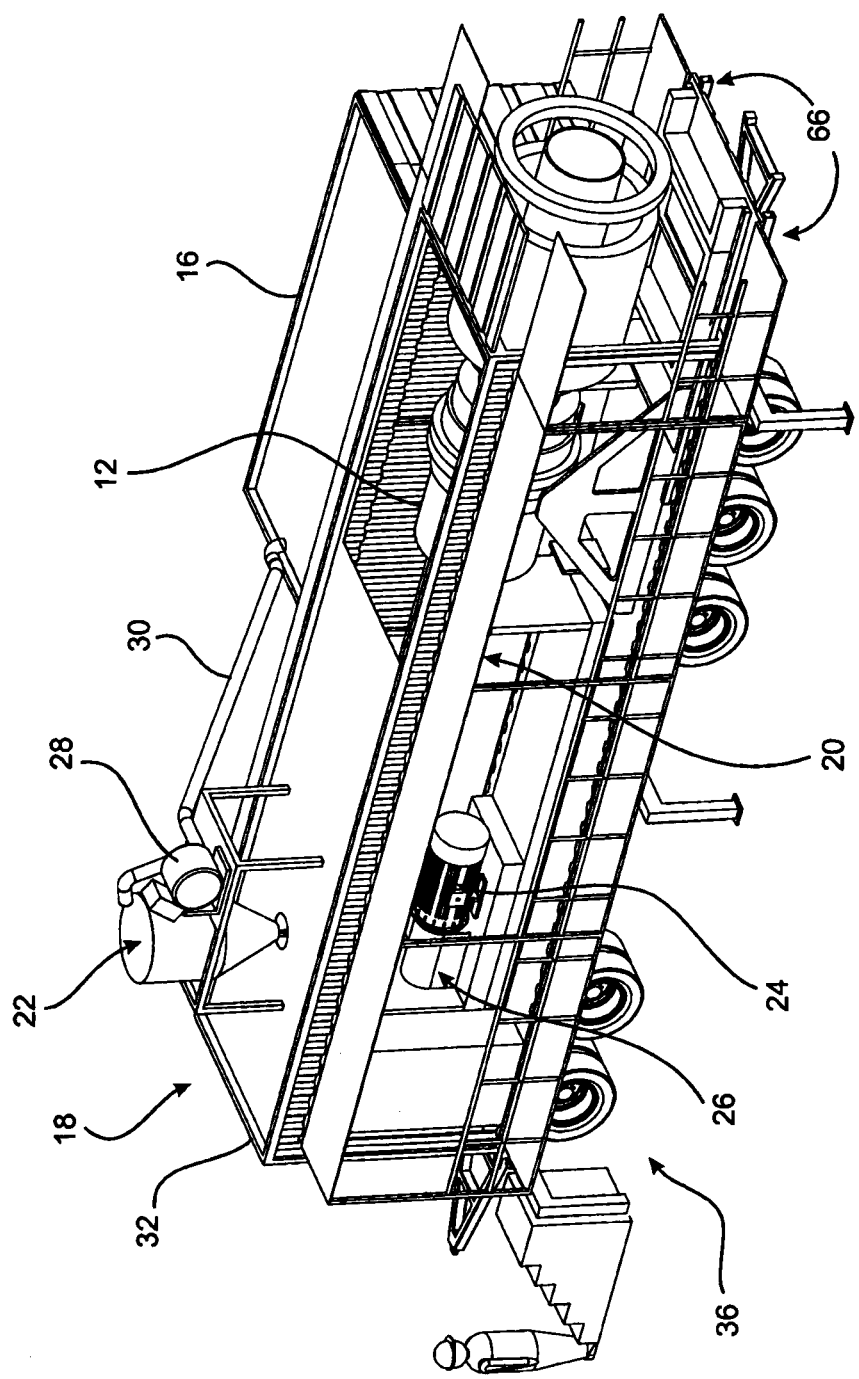
FIG. 5 is a partially cut-away, top perspective view of a second semitrailer of the mobile plant of FIG. 1.
Figure 8:
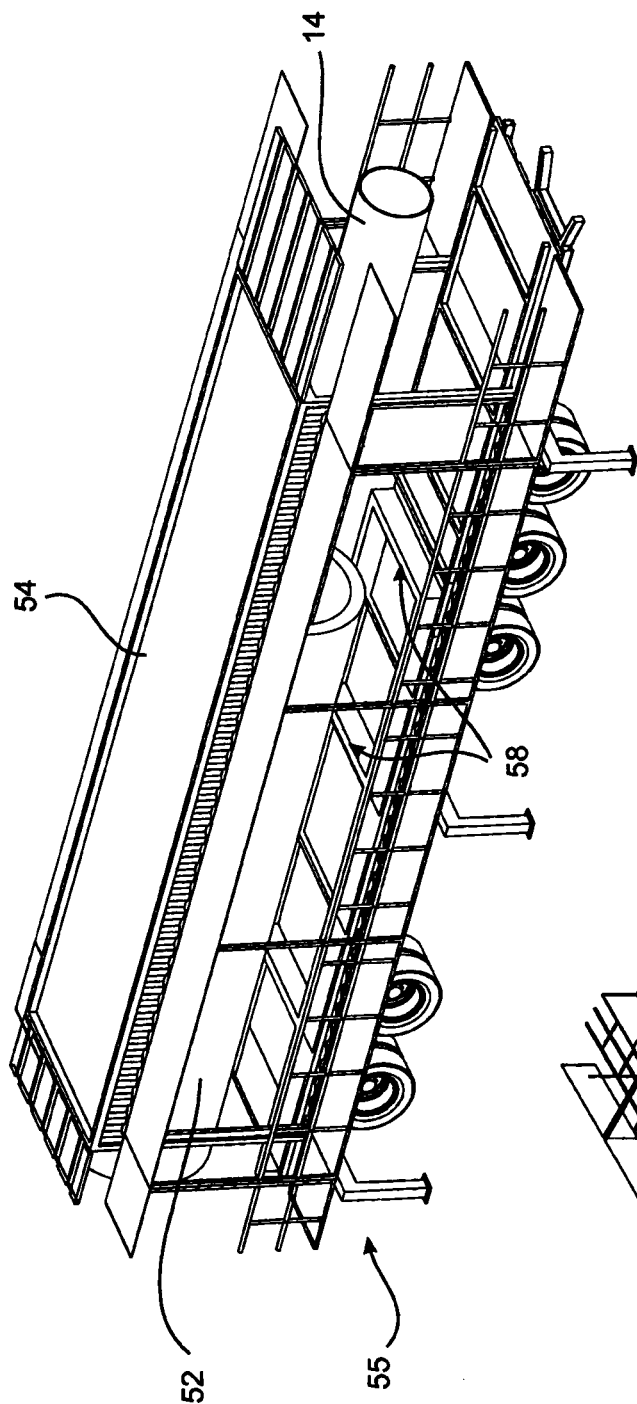
FIG. 8 is a partially cut-away, top perspective view of a third semitrailer of the mobile plant of FIG. 1.
Figure 9:
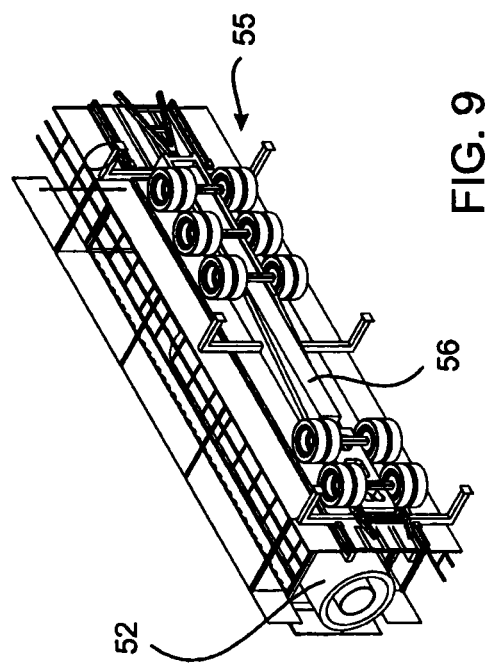
FIG. 9 is a bottom perspective view of the third semitrailer illustrated in FIG. 8.
Figure 10:
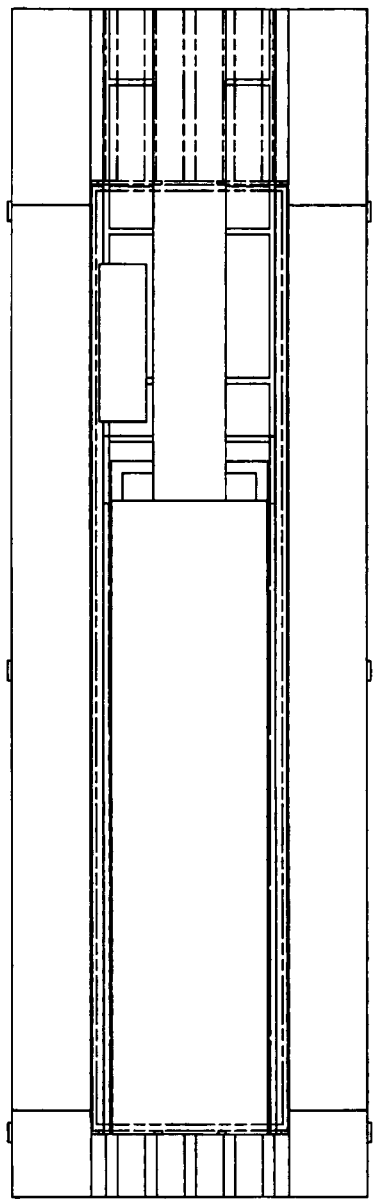
FIG. 10 is a partially cut-away, top plan view of the third semitrailer illustrated in FIG. 8.
Figure 11:
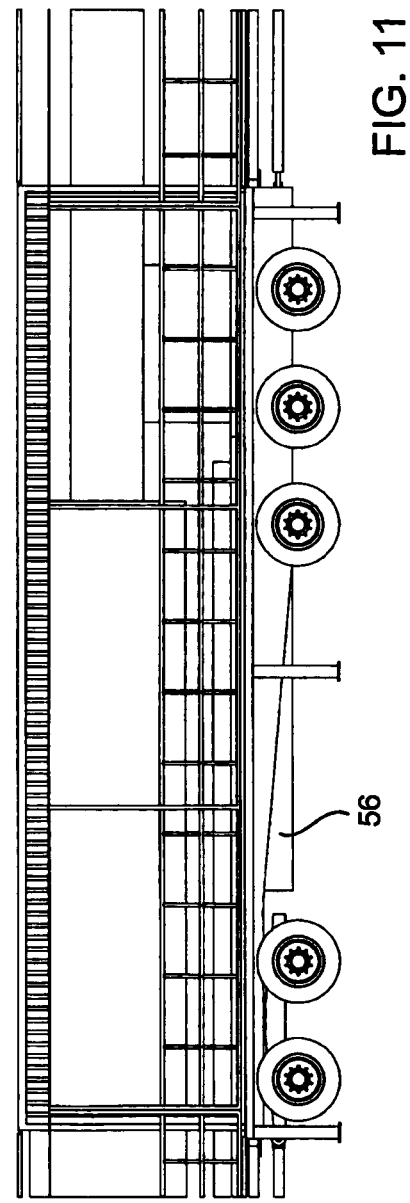
FIG. 11 is a partially cut-away, side elevation of the third semitrailer illustrated in FIG. 8.

The high vacuum tank 50 is housed in the second large shipping container 32 transported on the second semitrailer 36 (see FIGS. 5, 6 and 7). The low vacuum tank 52 is housed in a third large shipping container 54 transported on a third semitrailer 55 (see FIGS. 5, 6 and 7). Water for the two stage vacuum tank is stored in a plurality of 2500 liter water tanks 56 mounted under the chassis of three of the semitrailers. As can be seen most clearly in FIG. 9, the water tanks are mounted between the chassis rails of the semitrailer. Lateral baffles 58 are provided within the tank at 600 mm intervals, (see FIG. 8) with camlock connectors provided for connecting hoses between tanks.

Figure 12:
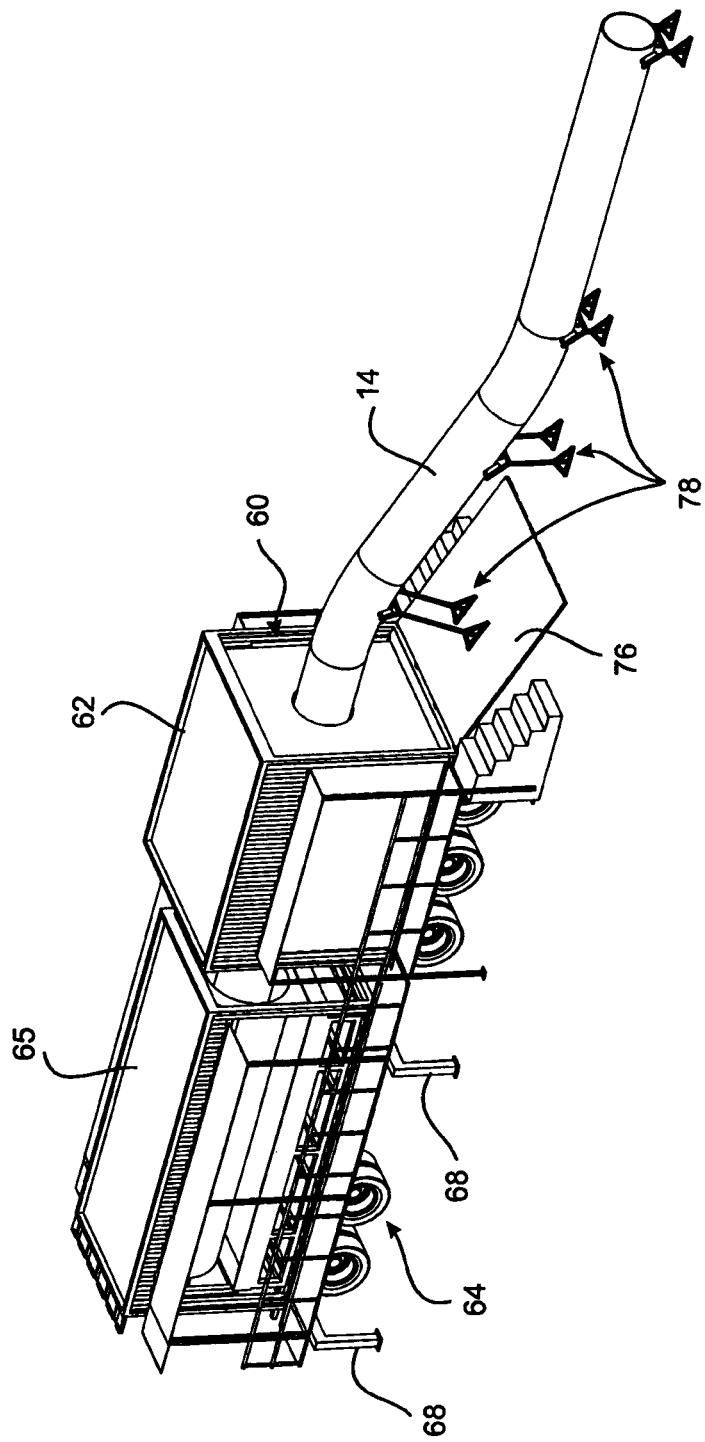
FIG. 12 is a partially cut-away, top perspective view of a fourth semitrailer of the mobile plant of FIG. 1.

The mobile plant 10 preferably further comprises a transportable haul-off assembly 60 for controlling the rate at which the extruded plastics product comes out of the plant. The extruded pipe 14 is pushed out of the die and former assembly 12 at a predetermined rate, and the haul-off assembly 60 governs the rate at which the pipe 14 comes out of the plant, and hence also controls the wall thickness. Preferably a plurality of ultrasonic sensors (not visible) is provided, typically in connection with the haul-off assembly 60, for monitoring the wall thickness in six quadrants. In the illustrated embodiment the haul-off assembly 60 is the final stage of the mobile extrusion plant 10, and is mounted in a modified container 62. The modified container 62 is transported on a fourth semitrailer 64, as illustrated in FIGS. 12, 13 and 14. Another shipping container 65, also transported on the fourth semitrailer 64 has facilities for further cooling of the plastics material of the pipe 14 before it enters the haul-off assembly 60.

The rear end wall 76 of the fourth shipping container (housing the haul-off assembly 60) opens to form a ramp with support and guide rollers 78 for supporting and guiding the extruded pipe product from the elevated height of the mobile plant 10 to ground level (see FIGS. 1, 12 and 14).

Advantageously each of the semitrailers 34, 36, 55, and 64 is provided with stabilising means for locking the trailer to an adjacent semitrailer whereby, in use, when the mobile plant 10 is in a stationary position the plurality of semitrailers can be locked together to form a rigid, stable platform for the components of the mobile plant 10. Typically the stabilising means comprises a plurality of retractable connecting beams 66 provided on the chassis of each semitrailer, each connecting beam 66 being extendable so as to engage with the chassis of an adjacent trailer (see FIG. 5). Preferably the stabilising means further comprises a plurality of retractable stabilisers 68 whereby, in use, when the mobile plant 10 is in a stationary position the stabilisers 68 can be extended to further stabilise the chassis of each of the semitrailers 34, 36, 55, and 64.

Advantageously each semitrailer is provided with a retractable walkway 70 whereby, is use, when the mobile plant 10 is in a stationary position plant operators can walk from one end of the mobile plant to the other. Advantageously each walkway 70 is also provided with its own weather roof 72 to protect pant operators from direct sunlight, precipitation and other adverse weather conditions. Preferably the retractable walkway 70 folds down from a longitudinal side of the semitrailers. Preferably there are two retractable walkways 70, one on each longitudinal side of each semitrailer. In one embodiment the side walls of the shipping containers split longitudinally to form hinged panels which fold down or fold up to form the retractable walkways 70 and weather rooves 72 respectively for the walkways.

Preferably each of the transportable components of the mobile extrusion plant 10 are mounted on rails so as to slidable within or between their respective containers. For this purpose, the end walls of each container also preferably split horizontally, with the bottom half fitted with rails to enable equipment to be moved between containers Now that a preferred embodiment of the mobile extrusion plant has been described in detail, it will be apparent that the described embodiment provide a number of advantages over the prior art, including the following:

(i) By continuously manufacturing the extruded pipe in situ, significant cost reductions can be achieved due to the elimination of the need for welding pipe lengths and more efficient transport of the raw material compared to pipe transport costs.

(ii) Improved quality of the end product due to minimal handling and continuous manufacturing process.

(iii) Whenever a pipe made from plastic's material is cut, it results in toe-in at the cut ends. When the pipes are rejoined (welded together) it is almost impossible to eliminate irregularities in the internal pipe diameter due to toe-in. Such irregularities produce turbulence and the resulting increased wear with slurry fluids significantly reduces the lifetime of the pipeline. By continuously manufacturing the pipe problems caused by toe-in are eliminated.

It will be readily apparent to persons skilled in the relevant arts that various modifications and improvements may be made to the foregoing embodiments, in addition to those already described, without departing from the basic inventive concepts of the present invention. For example, with some modifications the mobile extrusion plant 10 can also operate whilst in motion and therefore the invention is not limited to the stationary embodiment illustrated. Therefore, it will be appreciated that the scope of the invention is not limited to the specific embodiments described.

The invention claimed is:

1. A mobile plastics extrusion plant for manufacturing a continuous, extruded plastics product in a remote location, the mobile plant comprising the following transportable components:
   a transportable container for storing raw plastics material prior to extrusion;
   a transportable extruded product forming assembly for forming an extruded plastics product from the raw plastics material;
   a transportable delivery system for delivering the raw plastics material from the transportable container to the extruded product forming assembly;
   each transportable component of the mobile plant being housed in a shipping container and the shipping containers being mounted on a plurality of semitrailers joined end to end for transporting the mobile plant by road wherein, in use, the entire plant can be transported to the remote location and operated to manufacture the continuous, extruded plastics product;
   wherein each semitrailer is provided with stabilising means for locking the semitrailer to an adjacent semitrailer so that when the mobile plant is in a stationary position the plurality of semitrailers can be locked together to form a rigid, stable platform for the components of the mobile plant whereby, in use, each component of the mobile plant can be connected to a component in an adjacent container to form a continuous product manufacturing path through the plant; and
   wherein the stabilising means comprises a plurality of retractable connecting beams provided on a chassis of each semitrailer, each connecting beam being extendable so as to engage with a chassis of an adjacent semitrailer.

2. A mobile plastics extrusion plant as defined in claim 1, wherein the extruded product forming assembly comprises a die and former assembly.

3. A mobile plastics extrusion plant as defined in claim 2, wherein the transportable delivery system comprises a screw conveyor for conveying the raw plastics material under pressure to the die and former assembly.

4. A mobile plastics extrusion plant as defined in claim 1, wherein the mobile plastics extrusion plant further comprises:
   a transportable vacuum tank for cooling the extruded plastics product; and,
   a transportable haul-off assembly for controlling the rate at which the extruded plastics product comes out of the plant.

5. A mobile plastics extrusion plant as defined in claim 1, wherein the mobile plastics extrusion plant further comprises:
   a transportable electric generator for generating electrical power to operate powered components of the mobile plant.

6. A mobile plastics extrusion plant as defined in claim 1, wherein each semitrailer is provided with a retractable walkway whereby, in use, when the mobile plant is in the stationary position plant operators can walk from one end of the mobile plant to the other.

7. A mobile plastics extrusion plant as defined in claim 6, wherein the retractable walkway folds down from a longitudinal side of the semitrailers.

8. A mobile plastics extrusion plant as defined in claim 7, wherein there are two retractable walkways, one on each longitudinal side of the semitrailers.

9. A mobile plastics extrusion plant as defined in claim 1, wherein the stabilising means further comprises a plurality of retractable stabilisers whereby, in use, when the mobile plant is in the stationary position the stabilisers can be extended to further stabilise the chassis of the semitrailers.

\* \* \* \* \*